Feb. 2, 1960

W. H. NEWELL 2,923,477

METHOD AND APPARATUS FOR SOLVING
SIMULTANEOUS EQUATIONS

Filed Nov. 14, 1955

INVENTOR
WILLIAM H. NEWELL.

BY *(signature)*

ATTORNEY

United States Patent Office 2,923,477
Patented Feb. 2, 1960

2,923,477

METHOD AND APPARATUS FOR SOLVING SIMULTANEOUS EQUATIONS

William H. Newell, Mount Vernon, N.Y., assignor to Sperry-Rand Corporation, Ford Instrument Company Division, Long Island City, N.Y., a corporation of Delaware Application November 14, 1955, Serial No. 546,334

2 Claims. (Cl. 235—180)

This invention relates to a method and apparatus for solving simultaneous equations and particularly to a method and apparatus for solving simultaneous equations which are based on a principle of error nullification rather than elimination of variables.

In general, the invention proposes to provide novel means for determining values for the independent variables in a system of equations by separately calculating the total errors in each of the equations and converting these errors to errors in the initially assumed values for the independent values which are continuously modified by the converted errors until the total errors have been nulled.

Figure 2:
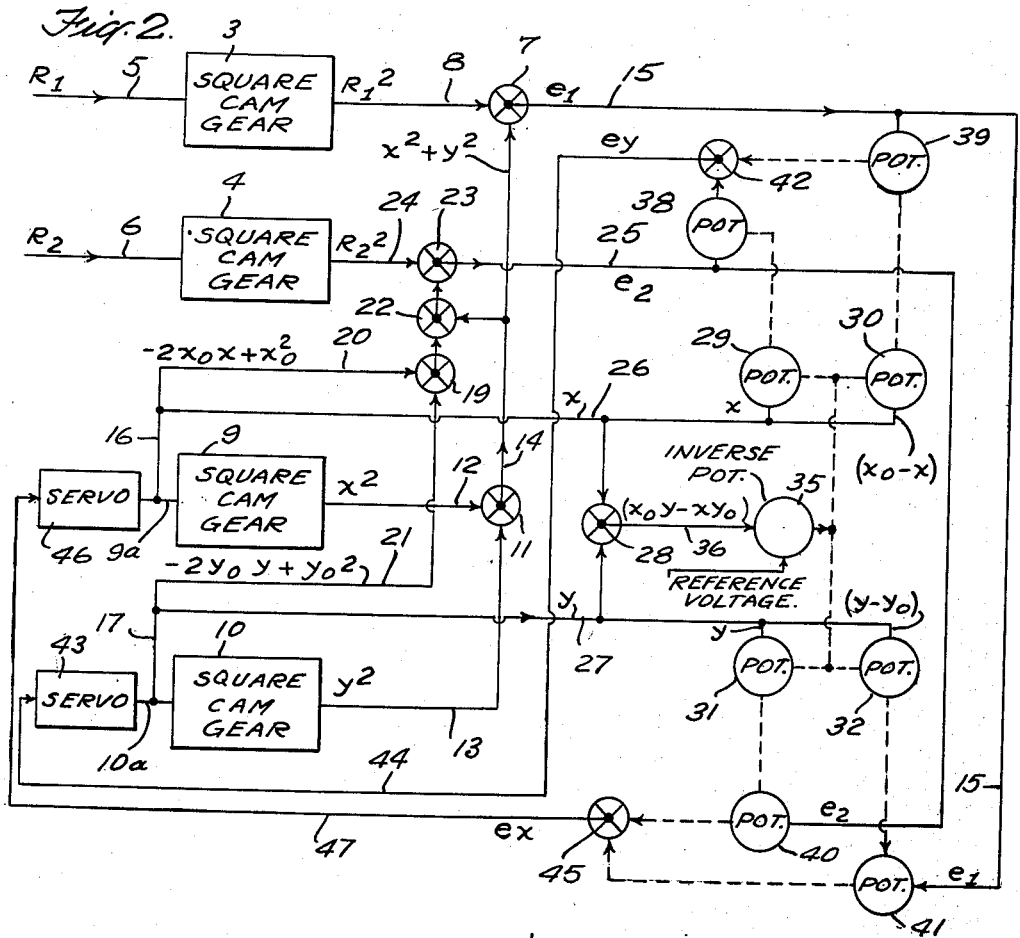
Figure 1:
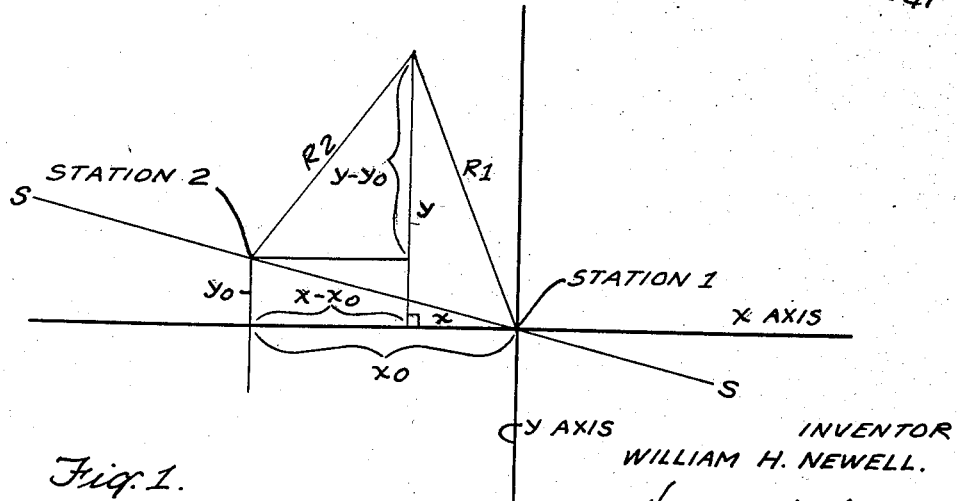

The proposed method and apparatus for effecting the solutions is illustrated by application to a particular problem but the invention is not to be construed as limited to the disclosed instrumentation since the actual arrangement of the error calculation and converting sections of the computer will in each case depend on the problem to be solved and the equations required for solution. A principle object of the invention is to provide a method for solving for more than one independent variable where there is given more than one mathematical expression for the relation of the variables. Another object of the invention is to provide a method and apparatus for solving simultaneous equations which do not initially require accurate inputs for the independent variables due to the fact that the solutions are made by nulling the errors arising from assumed values for the variables. The accurate mechanism is therefore confined to the error calculating portion of the device the function of which is to mechanize the equations and determine their errors. The error converting mechanism is responsive to the errors and does not require a high degree of accuracy since it ceases operation when the errors have been nulled. Hence, the principle of operation of the device departs from prior techniques involving elimination of variables and requiring successive steps of performance. Still another object of the invention is to provide a particular apparatus for solving shoran problems requiring solution of simultaneous equations which apparatus is described and illustrated in the accompanying drawings, in which Fig. 1 illustrates the shoran problem solved by the device; and Fig. 2 shows schematically an embodiment adapted to make a solution of the problem.

The invention proposes to solve simultaneous equations in mechanized form by obtaining the mechanized error for each equation and transforming this group of errors into errors for the quantities initially assumed for each variable, for example, assume that simultaneous equations are to be solved such as (1) $\quad f_1(x,y\ldots)=0$
(2) $\quad f_2(x,y\ldots)=0$
(3) $\quad f_3(x,y\ldots)=0$ If each of these equations is mechanized directly and the instrument is not at the correct values then (4) $\quad f_1(x+e_x, y+e_y, \ldots)=e_1$
(5) $\quad f_2(x+e_x, y+e_y, \ldots)=e_2$
(6) $\quad f_3(x+e_x, y+e_y, \ldots)=e_3$ where $e_x$ and $e_y$ are the errors in the corresponding independent variables, $x$ and $y$, and $e_1$, $e_2$ and $e_3$ are the total errors in the given equations.

In accordance with the present invention the total errors are expressed in terms of the individual functions and the errors in the independent variables as follows:

(7) $\quad e_1=\dfrac{\delta f_1}{\delta x}e_x+\dfrac{\delta f_1}{\delta y}e_y+\ldots$ (8) $\quad e_2=\dfrac{\delta f_2}{\delta x}e_x+\dfrac{\delta f_2}{\delta y}e_y+\ldots$ (9) $\quad e_3=\dfrac{\delta f_3}{\delta x}e_x+\dfrac{\delta f_3}{\delta y}e_y+\ldots$ Thus the total errors may be easily and accurately determined by means of highly accurate procedures for computer mechanization from Equations 4, 5 and 6. The technique for transforming or converting the total errors to errors in the respective variables must conform to the solutions to the error Equations 7, 8 and 9 above and, therefore, the error transforming mechanism is predicated on the mathematical solutions to these equations. The solution of Equations 7, 8 and 9 however need not require highly accurate components since the answer eventually nulls itself. A typical problem capable of solution in accordance with these principles is illustrated in Fig. 1. Shoran stations 1 and 2 are located on the base line S—S and their $x$ and $y$ coordinates $x_0$ and $y_0$ for station 2 are known. The distance $R_1$ and $R_2$ from the stations 1 and 2, respectively, are also known and it is desired to convert $R_1$ and $R_2$ into $x$ and $y$ coordinates in the same coordinate system.

It is apparent that the following relationships are true:

(10) $\quad x^2+y^2-R_1^2=0=f_1(x,y)$
(11) $\quad (x_0-x)^2+(y-y_0)^2-R_2^2=0=f_2(x,y)$ OR
(12) $\quad x^2-2x_0x+y^2-2yy_0-R_2^2+x_0^2+y_0^2=0=f_2(x,y)$ Equations 7 and 8 are solved for the errors in the independent variables in the Equations 10 and 12 as follows:

(13) $\quad e_1=2x\,e_x+2ye_y$
(14) $\quad e_2=-2(x_0-x)e_x+2(y-y_0)e_y$

Equations 13 and 14 are solved for $e_x$ and $e_y$ as follows:

(15) $\quad e_x=\dfrac{\begin{vmatrix} e_1\dfrac{\delta f_1}{\delta y} \\ e_2\dfrac{\delta f_2}{\delta y} \end{vmatrix}}{\begin{vmatrix} \dfrac{\delta f_1}{\delta x}\dfrac{\delta f_1}{\delta y} \\ \dfrac{\delta f_2}{\delta x}\dfrac{\delta f_2}{\delta y} \end{vmatrix}}=\dfrac{\dfrac{\delta f_2}{\delta y}e_1-\dfrac{\delta f_1}{\delta y}e_2}{\dfrac{\delta f_2}{\delta y}\dfrac{\delta f_1}{\delta x}-\dfrac{\delta f_1}{\delta y}\dfrac{\delta f_2}{\delta x}}=\dfrac{(y-y_0)e_1-ye_2}{2(x_0y-xy_0)}$

(16) $\quad e_y=\dfrac{\begin{vmatrix} \dfrac{\delta f_1}{\delta x}e_1 \\ \dfrac{\delta f_2}{\delta x}e_2 \end{vmatrix}}{\begin{vmatrix} \dfrac{\delta f_1}{\delta x}\dfrac{\delta f_1}{\delta y} \\ \dfrac{\delta f_2}{\delta x}\dfrac{\delta f_2}{\delta y} \end{vmatrix}}=\dfrac{\dfrac{\delta f_1}{\delta x}e_2-\dfrac{\delta f_2}{\delta x}e_1}{\dfrac{\delta f_1}{\delta x}\dfrac{\delta f_2}{\delta y}-\dfrac{\delta f_1}{\delta y}\dfrac{\delta f_2}{\delta x}}=\dfrac{xe_2+(x_0-x)e_1}{2(x_0y-xy_0)}$ Fig. 2 illustrates a possible mechanization for correcting variables until errors in the functions are nulled.

The errors $e_1$ and $e_2$, can be determined with accuracy. The distances $R_1$ and $R_2$ are fed to the square cam gears 3 and 4 on shafts 5 and 6 respectively. The output $R_1^2$ of square cam gear 3 is placed into one side of differential 7 by means of shaft 8.

The initial instrument values for the independent variables $x$ and $y$ are servoed on shafts 9ᵃ and 10ᵃ, respectively, to square cam gears 9 and 10 where they are squared and placed into differential 11 on shafts 12 and 13, respectively. The combined quantity $x^2$ and $y^2$ is placed by shaft 14 into the other side of differential 7 which compares the two inputs, the output $e_1$ being placed into the error transformation section of the device on shaft 15.

The Equation 12 is mechanized as follows: shafts 9ᵃ and 10ᵃ are connected to shafts 16 and 17, respectively. The shafts 16 and 17 are in turn connected to shafts 20 and 21, respectively, which are provided with suitable gearing (not shown) whereby the variables are modified by the known coordinates $x_0$ and $y_0$ for station 2 to yield the quantities $-2x_0x+x_0^2$ and $-2y_0y+y_0^2$, respectively, which are fed to a differential 19. The output of the differential 19 is placed into a second differential 22 which is also connected to shaft 14 and fed to a third differential 23 which compares the input with $R_2^2$ on shaft 24 representing the output of square cam gear 4. The output $e_2$ of the differential 23 on shaft 25 represents the total error due to errors in the variables in the Equation 12.

The total errors $e_1$ and $e_2$ are transformed into errors $e_x$ and $e_y$ for the variables $x$ and $y$ in accordance with the solutions to the simultaneous equations for the errors as follows: Shafts 26 and 27 are in driven connection with shafts 16 and 17, respectively, and are employed to feed the variables $x$ and $y$ into the error transformation section of the computer including the differential 28 and the potentiometers 29, 30, 31 and 32, respectively which convert the assumed and corrected values for the variables to their electrical equivalents.

Suitable gearing (not shown) is provided between the shafts 26 and 27 and the differential 28 whereby the variable $x$ is multiplied by the constant coordinate $y_0$ and the variable $y$ is multiplied by the constant coordinate $x_0$. The differential output, which may be represented by the quantity $x_0y-xy_0$, is placed into inverse potentiometer 35 on shaft 36. The potentiometer 35, which yields an output which is a reciprocal of its input, is referenced by a preselected voltage V and the output of potentiometer 35 in turn references the potentiometers 29, 30, 31 and 32. The voltages thereby placed across this latter group of potentiometers are proportional to a multiple of the reciprocal of the differential input to potentiometer 35 as required by the solution of the simultaneous equations for the errors. The variables $x$ and $y$ on the shafts 26 and 27 are converted to negative values and combined with the constants $x_0$ and $y_0$, by means of gearing (not shown) which is inserted between the shafts 26 and 27 and the potentiometers 30 and 32 respectively. A second potentiometer group including potentiometers 38, 39, 40 and 41, is supplied electrically by the potentiometers 29, 39, 31 and 32, respectively. The variable taps on the potentiometers 38 and 40 are controlled by the shaft 25 and the potentiometers 39 and 41 are similarly controlled by the shaft 15 whereby the total errors $e_1$ and $e_2$ are introduced into the error transformation section of the device according to the Equations 15 and 16 for the errors in the variables. Electrical differential 42 receives the outputs of the potentiometers 38 and 39, algebraically combines them and introduces the combined quantity as an error correction $e_y$ for the variable $y$ to servo 43 by means of feed back line 44. Similarly electrical differential 45 receives the outputs of the potentiometers 40 and 41, algebraically combines them in accordance with the solutions to the simultaneous equations for the error, $e_x$, and introduces the total as an error correction $e_x$ to servo 46 by means of a feed back line 47. The servos 43 and 46 are adapted to modify the original instrument values for the variables $x$ and $y$ at a rate which is proportional to or a function of the error corrections $e_x$ and $e_y$, respectively.

When the variables are fully corrected and represent true solution values, the total errors $e_1$ and $e_2$ are reduced to zero and the error computer section of the computer is nulled.

It is understood that the disclosure illustrates but one application of the principles of invention which may be reduced to practice in as many forms as there are problems to be solved. It should therefore be appreciated that the scope of invention is to be measured only in accordance with the recitations of the appended claims, in which:

What is claimed is:

1. A computer for solving simultaneous equations having more than one independent variable comprising a shaft settable in accordance with the solution constants for each of the equations, means for mechanizing each of the equations and yielding a solution for each of the equations based on assumed and later modified values for their independent variables, comparison means connecting the shafts and equation mechanizing means for determining the total error in each of the equations, means connected to said comparison means and said mechanizing means for transforming said total errors into errors in the assumed values for said independent variables, and means connecting said transforming means to said mechanizing means for feeding back the transformed errors to the mechanizing means to modify the assumed values for the variables until the total errors have been nulled.

2. A computer for solving simultaneous equations having more than one independent variable comprising a shaft settable in accordance with the solution constants for each of the equations, means for mechanizing each of the equations and yielding a solution for each of the equations based on assumed and later modified values for their independent variables, comparison means connecting the shafts and equation mechanizing means for determining the total error in each of the equations, means connected to said comparison means and said mechanizing means for transforming said total errors into errors in the assumed values for said independent variables, and means connecting said transforming means to said mechanizing means for feeding back the transformed errors to the equation mechanizing means to modify the assumed values for the variables until the total errors have been nulled, said transforming means comprising means for determining errors, $e_x$ and $e_y$, in the assumed values for the independent variables $x$ and $y$, respectively, means for determining the denominator analog $2(x_0y-xy_0)$, means for determining the numerator analogs $(y-y_0)e_1-ye_2$ and $xe_2+(x_0-x)e_1$, and means for dividing each of the numerator analogs by the denominator analog so as to generate the errors $e_x$ and $e_y$, respectively, where $x$ and $y$ are the independent variables, $x_0$ and $y_0$ are preselected constants and $e_1$ and $e_2$ are the computed total errors in the simultaneous equations based on the assumed and later modified values for the variables $x$ and $y$.

References Cited in the file of this patent

UNITED STATES PATENTS

| | | |
|---|---|---|
| 2,402,088 | Ross | June 11, 1946 |
| 2,455,974 | Brown | Dec. 14, 1948 |

FOREIGN PATENTS

| | | |
|---|---|---|
| 1,062,270 | France | Dec. 2, 1953 |